UNITED STATES PATENT OFFICE.

RALPH E. DINGS AND LIONEL SCHUSTER, OF NEW YORK, N. Y.

WATERPROOF VARNISH.

1,326,917.  Specification of Letters Patent.  Patented Jan. 6, 1920.

No Drawing.  Application filed November 22, 1918. Serial No. 263,676.

*To all whom it may concern:*

Be it known that we, RALPH E. DINGS and LIONEL SCHUSTER, citizens of the United States, residing in the city, county, and State of New York, have invented a new and useful Improvement in Waterproof Varnish, of which the following is a specification.

The invention is water-proof, quick-drying varnish, suitable especially as a substitute for liquid shellac, either as a varnish or wood filler, or as a substitute for other quick-drying varnish. It comprises a solution of a gum, preferably Manila gum, in alcohol, with a wax, such as carnauba wax, dissolved in spirits of turpentine or other appropriate solvent.

The formula which has been found to give best results is:

Alcohol-soluble Manila gum____ 200 pounds.
Alcohol_____ 40 gallons.
Carnauba wax_____ 100 ounces.
Spirits of turpentine_____ 4 gallons.

To prepare this varnish dissolve the gum in alcohol. Allow to settle until clear, then pour off the clear solution. Dissolve the wax in the turpentine to a temperature of 200° F. and mix the two solutions together and agitate thoroughly.

We do not limit ourselves to the precise ingredients or proportions. The alcohol may be of any kind, but it is most advantageous to use denatured alcohol. Alcohol-soluble Manila gum is the gum more particularly contemplated, but in some instances other alcohol-soluble gums may be employed. Instead of spirits of turpentine to dissolve the wax, benzin, gasolene or naphtha may be selected, though with less beneficial results.

What we claim as new is:

1. A varnish suitable as a substitute for liquid shellac, comprising a solution of Manila gum with dissolved carnauba wax.

2. A varnish suitable as a substitute for liquid shellac, comprising an alcohol solution of Manila gum with dissolved carnauba wax.

3. A varnish suitable as a substitute for liquid shellac, comprising an alcohol solution of Manila gum with carnauba wax dissolved in spirits of turpentine.

4. A varnish suitable as a substitute for liquid shellac, comprising a mixed solution composed substantially of 200 pounds of Manila gum to 40 gallons of alcohol with 100 ounces of carnauba wax to 4 gallons of spirits of turpentine.

RALPH E. DINGS.
LIONEL SCHUSTER.